United States Patent Office.

ADOLF WÜNSCHE, OF HAMBURG, GERMANY.

METHOD OF OBTAINING CARBONATE OF MAGNESIA.

SPECIFICATION forming part of Letters Patent No. 303,962, dated August 19, 1884.

Application filed January 22, 1884. (No specimens.) Patented in Germany July 29, 1881, No. 18,722.

*To all whom it may concern:*

Be it known that I, ADOLF WÜNSCHE, chemist, residing in the city of Hamburg, German Empire, have invented new and useful Improvements in the Method of Producing Magnesia and Carbonate of Magnesia, (for which I have obtained Letters Patent No. 18,722 in Germany, July 29, 1881,) of which the following is a specification.

My invention relates to the manufacture of carbonate of magnesia and caustic magnesia from soluble magnesic salts; and it substantially consists in treating a solution of such salts by ammonia and carbonic acid, and in heating the ammonium-magnesium carbonate thus obtained by preference with the addition of caustic magnesia. For this purpose I first mix the solution of the magnesium salt with any soluble ammonia salt, (for instance, chloride of ammonium.) Then I introduce caustic ammonia in gaseous state or in aqueous solution, and subsequently carbonic acid. During the introduction of the latter the temperature of the mixture rises considerably, and within a short time almost the whole quantity of magnesium precipitates as compound carbonate of magnesium and ammonia in crystals. The addition of any ammonia salt previous to the introduction of caustic ammonia may be omitted. In this case a part of the dissolved magnesium will be precipitated by caustic ammonia as hydroxide, which, however, also combines with ammonia and carbonic acid, so that the resulting ammonium-magnesium carbonate will not be altered in its composition. Its condition is but less fit for the succeeding lixiviation.

Instead of introducing ammonia and carbonic acid separately into the solution of the magnesic salt a solution of carbonate of ammonia may also be used; but the precipitate obtained by means of the same consists of but very small crystals. In case the magnesic salt contained in the solution to be treated is chloride of magnesium, and when chloride of ammonium is added previous to the introduction of ammonia, the process takes place according to the following equation: $MgCl_2 + x(H_2O) + NH_4Cl) + 4NH_3 + 2CO_2 = [Mg(NH_4)_2(CO_3)_2 + 4H_2O] + (x+2)NH_4Cl + (x-6)H_2O$. It will be seen herefrom that to obtain all the magnesia from the solution four equivalents of ammonia and two equivalents of carbonic acid are required theoretically. In practice, however, a somewhat greater quantity has to be employed, while even then a small amount of the magnesia fails to combine with the ammonia and the carbonic acid. The precipitated crystalline mass is put on a filter and allowed to become drained of the greater portion of the adhering lye, whereupon the rest is removed by lixiviation with ammoniacal liquor. Hereafter the mass is subjected to the further process of converting it into carbonate of or caustic magnesia. This process may be carried out in two different ways.

According to the first mode of proceeding the ammonium-magnesium carbonate is heated alone—*i. e.*, without the admixture of any other substance. The ammonia and a part of the carbonic acid will then be at first disengaged, and, if the heating is carried on until all ammonia has passed off, carbonate of magnesia will remain behind. For this operation but a moderate heat is required. By then raising the temperature and calcining the said carbonate caustic magnesia will be obtained. A higher temperature may, however, be applied from the beginning, if preferred.

According to the second mode of procedure, the compound salt of ammonia and magnesia, which may still be wet, is mixed in a closed apparatus with caustic magnesia, which may have been obtained by a previous process conducted according to my invention, whereupon the mixture is moderately heated. By this treatment the ammonia, which already commences to be evolved at the ordinary temperature of the air, is driven off separately, while the carbonic acid having been combined with the ammonia, passes over to the caustic magnesia. After the complete disengagement of the ammonia, the carbonic acid may be expelled by calcination, as in the first place.

The decomposition of the ammonium-magnesium carbonate by caustic magnesia takes place according to the equation: $[Mg(NH_4)_2(CO_3)_2 + 4H_2O] + MgO + H_2O = 2(MgCO_3 + 3H_2O) + 2NH_3$.

In the calcining process the decomposition may be expressed by the equation: $MgCO_3 + 3H_2O = MgO + CO_2 + 3H_2O$.

The ammonia and the carbonic acid evolved in either of the two operations are or may be reutilized in the production of ammonium-magnesium carbonate; but, considering that it is advantageous to obtain this compound in large crystals, and that for such purpose ammonia and carbonic acid have to be introduced one after the other into the original solution of magnesic salt, the second mode of decomposing the said compound is to be preferred, as by its means the two gases are evolved separately, whereas the carbonate of ammonia obtained by the first method of decomposition would require a special process for disuniting the ammonia from the carbonic acid. The caustic magnesia to be used for decomposing the compound carbonate according to the second method requires to be heated but moderately while being prepared from compound carbonate previously obtained. The portion of caustic magnesia which is to constitute the final product is calcined at any other temperature adapted to the purpose for which the magnesia is to be used.

The heating of the ammonium-magnesium carbonate may be carried out in either process of decomposition by means of steam introduced into the vessel containing the said carbonate; but I prefer to heat the vessel from the outside, as in this case the carbonate of magnesium will remain in compact pieces well adapted for the further process of calcination. This process may be performed in crucibles or retorts, or in a reverberatory or a shaft furnace.

The ammonia contained in the lye and in the lixiviating liquid resulting from the first stage of the process, may be regenerated by a treatment of the said liquids in known manner with lime, or preferably with burned dolomite or magnesite. The solution of magnesia obtained in the latter case may then be added to the solution from which the ammonium-magnesium carbonate is to be produced.

The solutions of salts of magnesia to be used according to my improved process may be such as are obtained in different branches of industry—as, for instance, the lyes of chloride of magnesium resulting as by-product in the manufacture of the chlorides of sodium and potassium; or the solutions are prepared from dolomite or magnesite, or other minerals containing carbonate of magnesia. The process to be employed for this purpose does not, however, constitute any part of my present invention.

I claim as my invention—

1. The method of producing carbonate of magnesium and caustic magnesia from soluble magnesic salts, by introducing into a solution thereof ammonia and carbonic acid, whereby ammonium-magnesium carbonate is formed, and in thereupon separating the said ammonium-magnesium carbonate from the lye, and heating it for the purpose of driving off ammonia and a part or the whole of the carbonic acid, substantially as described.

2. In combination with the treatment of soluble magnesic salts by ammonia and carbonic acid, the addition to the ammonium-magnesium carbonate thereby obtained of caustic magnesia, and subsequent heating of the mixture, as and for the purpose specified.

In testimony whereof I have signed my name to this specification in the presence of two subscribing witnesses.

ADOLF WÜNSCHE.

Witnesses:
OTTO PASSAVANT,
THEODOR GOERING.